United States Patent
Wakikawa et al.

(10) Patent No.: US 8,938,544 B2
(45) Date of Patent: Jan. 20, 2015

(54) VEHICLE NETWORK CONNECTIVITY MANAGEMENT

(75) Inventors: Ryuji Wakikawa, Mountain View, CA (US); Roger D. Melen, Los Altos Hills, CA (US)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 266 days.

(21) Appl. No.: 13/417,014

(22) Filed: Mar. 9, 2012

(65) Prior Publication Data

US 2013/0238807 A1    Sep. 12, 2013

(51) Int. Cl.
*G06F 15/16* (2006.01)

(52) U.S. Cl.
USPC .................. 709/227; 709/200; 455/456.1

(58) Field of Classification Search
USPC ............ 709/227, 200, 219, 203; 455/40, 441, 455/456.1

IPC .................................................... H04L 2209/80
See application file for complete search history.

(56) References Cited

U.S. PATENT DOCUMENTS

| | | | |
|---|---|---|---|
| 2004/0167710 A1* | 8/2004 | Fushiki et al. | 701/208 |
| 2008/0085707 A1* | 4/2008 | Fadell | 455/435.3 |
| 2009/0012675 A1* | 1/2009 | Laghrari et al. | 701/33 |
| 2010/0311468 A1 | 12/2010 | Shi et al. | |

* cited by examiner

*Primary Examiner* — El Hadji Sall
(74) *Attorney, Agent, or Firm* — Patent Law Works LLP

(57) ABSTRACT

A system and method for determining a network is disclosed. The system comprises a requesting module and a determination module. The requesting module sends a request from a vehicle for network data to a connectivity server. The request includes vehicle data describing a current location of the vehicle and a destination for the vehicle. The requested network data is associated with the vehicle data. The determination module receives the network data relating to one or more networks. The determination module caches the network data and determines which network to connect to from the one or more networks based at least in part on the network data.

14 Claims, 8 Drawing Sheets

US 8,938,544 B2

VEHICLE NETWORK CONNECTIVITY MANAGEMENT

BACKGROUND

The specification relates to vehicular networking systems. In particular, the specification relates to a system and method for managing network connectivity for a vehicle.

Wireless communication methods such as 3G/Long Term Evolution (3G/LTE), WiFi and satellite communication are currently being deployed rapidly for applications associated with vehicles, e.g., an internet radio, streaming, a mobile phone or any network-based service in a car. These applications improve the traveling experience for drivers and passengers. However, disruption of these services could dramatically reduce the quality of the drivers' and passengers' experience. Although the coverage of wireless networks is being improved, coverage is mostly in heavily populated areas, but in rural areas that are less populated, wireless signals may be commonly weak or not available. Therefore, a vehicle operating in such areas may end up with poor or intermittent network connectivity.

SUMMARY OF THE INVENTION

The specification overcomes the deficiencies and limitations of prior art at least in part by providing a system and method for determining a network. The system comprises a requesting module and a determination module. The requesting module sends a request from a vehicle for network data to a connectivity server. The request includes vehicle data describing a current location of the vehicle and a destination for the vehicle. The requested network data is associated with the vehicle data. The determination module is communicatively coupled to the requesting module. The determination module receives the network data from the connectivity server. The network data is related to one or more networks. The determination module caches the network data and determines which network to connect to from the one or more networks based at least in part on the network data.

In one embodiment, the request includes vehicle data describing a current location of the vehicle, a destination for the vehicle and a driving route to the destination.

In one embodiment, the network data describes a coverage area for one or more networks, a network connection history for a vehicle, present congestion of one or more networks and a rule describing how the vehicle will determine a network to connect to.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
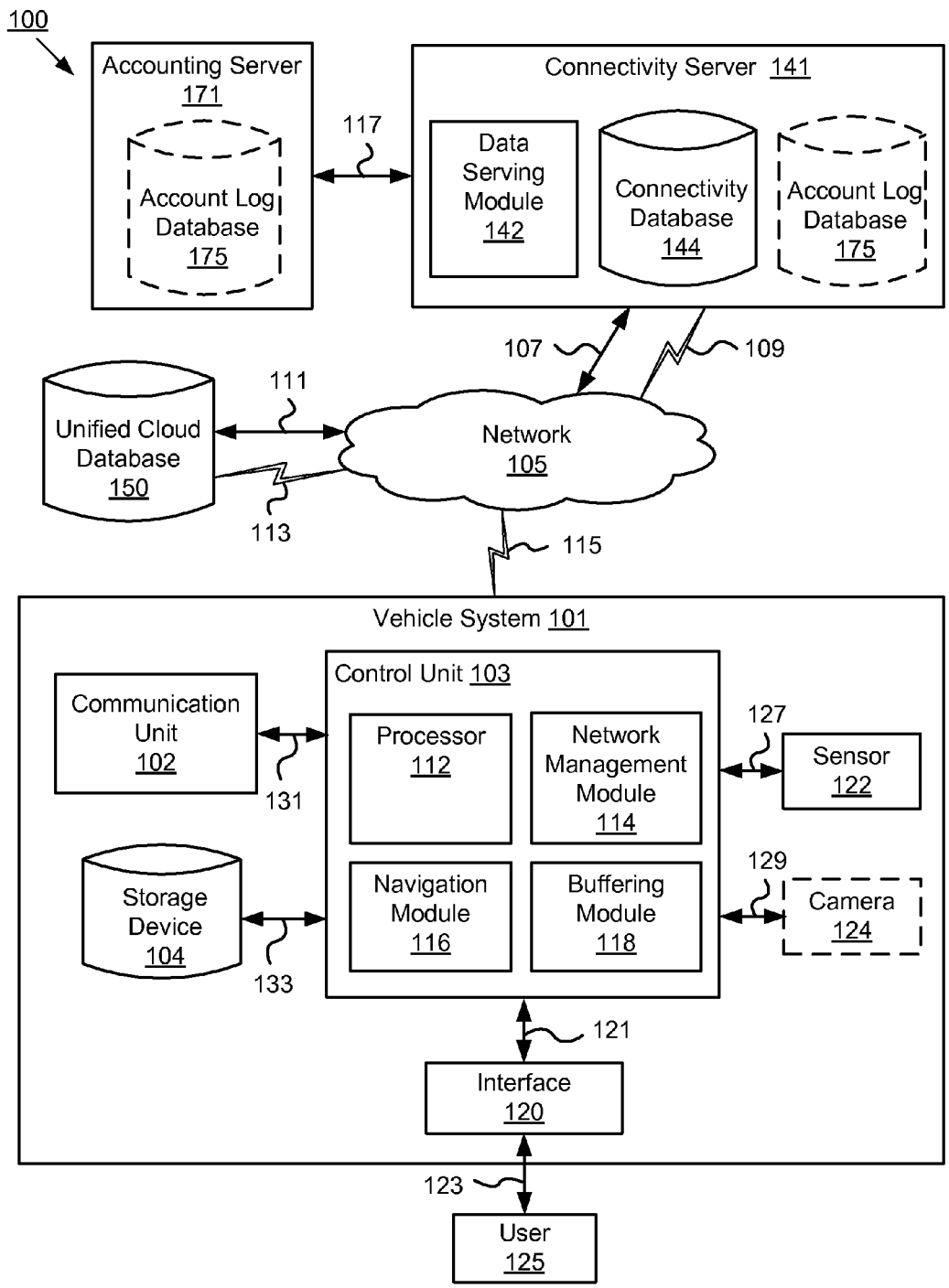
FIG. 1 is a high-level block diagram illustrating a system for managing network connectivity for a vehicle according to one embodiment.

A system and method for managing network connectivity for a vehicle is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for managing network connectivity for a vehicle according to one embodiment. The illustrated system 100 includes a vehicle system 101 that is accessed by a user 125, a connectivity server 141, an accounting server 171 and a unified cloud database 150. In the illustrated embodiment, the vehicle system 101, the connectivity server 141 and the unified cloud database 150 are communicatively coupled via a network 105. For example, the vehicle system 101 and the connectivity server 141 are communicatively coupled to each other via the network 105 to facilitate the transmitting and receiving of information (e.g., network data, connectivity data) between each other. The accounting server 171 is communicatively coupled to the connectivity server 141.

Although one vehicle system 101, one connectivity server 141, one accounting server 171 and one unified cloud database 150 are illustrated in FIG. 1, persons having ordinary skill in the art will recognize that any number of vehicle systems 101, connectivity servers 141, accounting servers 171 and unified cloud databases 150 can be included in the system 100. Furthermore, while only one network 105 is coupled to the vehicle system 101, the connectivity server 141 and the unified cloud database 150, persons having ordinary skill in the art will appreciate that any number of networks 105 can be connected to the vehicle system 101, the connectivity server 141 and the unified cloud database 150.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or include portions of a telecommunications network for sending data in a variety of different communication protocols. For example, the network 105 is a 3G/LTE network, a 4G network, a WiFi network or a WiMAX network. In another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc. In yet another embodiment, all or some of the links in the network 105 are encrypted using conventional encryption technologies such as secure sockets layer (SSL), secure HTTP and/or virtual private networks (VPNs).

In one embodiment, the network 105 is a Vehicular Ad-hoc Network (VANET) that uses moving vehicles as nodes. The network 105 is a mobile network where cars fall out of the communication range and drop out of the network while other cars join in.

In the illustrated embodiment, the connectivity server 141 is communicatively coupled to the network 105 via signal line 107 and signal line 109 (wirelessly). The accounting server 171 is communicatively coupled to the connectivity server 141 via signal line 117. The vehicle system 101 is communicatively coupled to the network 105 via signal line 115 (wirelessly). The user 125 interacts with the vehicle system 101 as represented by signal line 123. The unified cloud database 150 is communicatively coupled to the network 105 via signal line 111 and signal line 113 (wirelessly).

The connectivity server 141 is one or more devices having at least one processor coupled to at least one storage device including instruction for execution by the processor. For example, the connectivity server 141 is a conventional server, a server array or any other computing device or group of computing devices, having data processing and communication capabilities. In one embodiment, the connectivity server 141 is a hardware server device operated by an entity.

The connectivity server 141 comprises, among other things, a data serving module 142, a connectivity database 144 and an account log database 175. The account log database 175 is depicted using a dotted line to indicate that it is an optional element for the connectivity server 141. Accordingly, in one embodiment, the account log database 175 is included in the accounting server 171 and is not included in the connectivity server 141. The connectivity server 141 can access the account log database 175 via the accounting server 171.

The connectivity server 141 additionally comprises a processor (not pictured in FIG. 1), a memory (not pictured in FIG. 1) and other components conventional to a server device (firewall, network card, etc.). The components of the connectivity server 141 are communicatively coupled to one another.

In one embodiment, the illustrated components of the connectivity server 141 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the connectivity server 141 are performed by the accounting server 171 in other embodiments, if appropriate. In one embodiment, the functionality attributed to a particular component is performed by different or multiple components operating together.

Each of the various modules on the connectivity server 141 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The data serving module 142 is code and routines that, when executed by a processor (not pictured), processes requests for network data and serves network data to the vehicle system 101. For example, the data serving module 142 receives a request for network data from the vehicle system 101, retrieves the network data from the connectivity database 144 and the account log database 175 based at least in part on the request and sends the network data to the vehicle system 101 via the network 105.

The network data includes coverage data, accounting data, congestion data and connectivity rule and policy data. The coverage data describes network coverage information, e.g., a 3G/LTE/4G coverage map, WiFi/WiMAX hotspot information and a satellite map for each prospective carrier. The accounting data logs network connectivity information for each vehicle, e.g., the accounting data includes a connectivity data log for each vehicle and each entry of the log describes an amount of data usage, date of the data usage, a time of the data usage and a carrier providing the data usage. The congestion data describes how crowded a network is, e.g., if there is congestion in the network. The connectivity rule and policy data indicates rules and policies for selecting a best network for a vehicle. For example, the connectivity rule and policy data describes carrier priorities (e.g., telephone carrier A has a higher priority than telephone carrier B), wireless technology priorities (e.g., 3G ranks higher than WiFi, LTE and WiMAX; WiFi ranks higher than LTE and WiMAX; LTE ranks higher than WiMAX) and network priorities for different data types (e.g., for safety data, 3G has the highest priority; for movie data, WiFi has the highest priority).

In one embodiment, the data serving module 142 receives a request from the vehicle system 101 when a user 125 enters a new destination for the vehicle or when the vehicle system 101 estimates a new destination for the vehicle. The request received from the vehicle system 101 includes vehicle data. Vehicle data describes information associated with the vehicle. For example, the vehicle data includes location data, destination data and driving route data. The location data describes a current location of the vehicle. The destination data indicates a destination for the vehicle. The driving route data describes an expected driving route to the destination. In one embodiment, the vehicle data also includes vehicle velocity data describing an average vehicle velocity.

The data serving module 142 uses the vehicle data to search and locate network data in the connectivity database 144 and/or in the account log database 175. For example, the located network data includes coverage data describing one or more network coverage maps for the areas along the expected driving route to the destination. In one embodiment, the data serving module 142 accesses the account log database 175 via the accounting server 171. Once the requested network data is located, the data serving module 142 sends the network data to the vehicle system 101 via the network 105.

In one embodiment, the data serving module 142 receives a connectivity data log from the vehicle system 101. The connectivity data log is initially maintained in the vehicle system 101. For example, the connectivity data log includes entries and each of the entries includes connectivity data for the vehicle describing an amount of data usage, a date of the data usage, a time of the data usage and a carrier providing the data usage. Once receiving the connectivity data log, the data serving module 142 validates and analyzes each carrier's activity based at least in part on the connectivity data log. In one embodiment, the data serving module 142 stores the connectivity data log in the account log database 175. In another embodiment, the data serving module 142 transmits the connectivity data log to the accounting server 171 to store it in the account log database 175 included in the accounting server 171.

The connectivity database 144 is a storage system that stores data and/or information associated with network connectivity. For example, the connectivity database 144 stores coverage data, congestion data and connectivity rule and policy data. As described above with reference to the data serving module 142, the coverage data describes network coverage information, e.g., a 3G/LTE/4G coverage map, WiFi/WiMAX hotspot information and a satellite map for each prospective carrier; the congestion data describes how crowded a network is; the connectivity rule and policy data indicates rules and policies for selecting a best network for a vehicle. In one embodiment, the connectivity database 144 also stores accounting data.

The account log database 175 is a storage system that stores connectivity data logs transmitted from vehicle systems 101. For example, the connectivity data logs are stored in chronological order and categorized by vehicle identifiers for different vehicles. Each connectivity data log includes connectivity data describing an amount of data usage, a date of the data usage, a time of the data usage and a carrier providing the data usage for each vehicle. In one embodiment, the account log database 175 is an element of accounting server 171.

The accounting server 171 is one or more devices having at least one processor coupled to at least one storage device including instructions for execution by the processor. For example, the accounting server 171 is a conventional server, a server array or any other computing device or group of computing devices, having data processing and communication capabilities. In one embodiment, the accounting server 171 is a hardware server device operated by an entity.

The accounting server 171 is communicatively coupled to the connectivity server 141 via signal line 117. In one embodiment, the accounting server 171 comprises an account log database 175. The accounting server 171 communicates with the connectivity server 141 to sends the data stored in the account log database 175 to the connectivity server 141. For example, when a vehicle system 101 requests network data, the accounting server 171 retrieves accounting data (e.g., connectivity data logs) from the account log database 175 and sends the accounting data to the vehicle system 101 via the connectivity server 141.

The vehicle system 101 is a system embedded in a vehicle. For example, the vehicle is a car. In one embodiment, the vehicle system 101 transmits and/or receives data to and from the connectivity server 141 via the network 105. For example, a vehicle system 101 transmits a request for network data to the connectivity server 141 and receives the network data from the connectivity server 141.

The vehicle system 101 comprises a communication unit 102; a control unit 103 that includes a processor 112, a network management module 114, a navigation module 116 and a buffering module 118; a sensor 122; a camera 124; an interface 120 and a storage device 104. Although only one sensor 122, one camera 124, one control unit 103, one communication unit 102, one interface 120 and one storage device 104 are depicted in FIG. 1, persons having ordinary skill in the art will recognize that the vehicle system 101 can include any number of sensors 122, cameras 124, control units 103, communication units 102, storage devices 104 and interfaces 120. Furthermore, persons having ordinary skill in the art will also appreciate that the vehicle system 101 may include other entities not shown in FIG. 1 such as a speaker, a display device, an input device, etc.

The communication unit 102 is communicatively coupled to the control unit 103 via signal line 131. The sensor 122 is communicatively coupled to the control unit 103 via signal line 127. The camera 124 is communicatively coupled to the control unit 103 via signal line 129. The storage device 104 is communicatively coupled to the control unit 103 via signal line 133. The interface 120 is communicatively coupled to the control unit 103 via signal line 121. The user 125 interacts with the interface 120 as represented by signal line 123.

The communication unit 102 is any computing device that transmits and receives signals. For example, the communication unit 102 includes a Dedicated Short Range Communications (DSRC) device. In one embodiment, the communication unit 102 is implemented using hardware such as field-programmable gate array (FPGA) or an application-specific integrated circuit (ASIC). In another embodiment, the communication unit 102 is implemented using a combination of hardware and software. In one embodiment, the communication unit 102 includes an antenna. The antenna is an electrical device that converts electric currents into radio waves, and vice versa. For example, the antenna is a steerable beam directional antenna.

In one embodiment, the communication unit 102 handles communication with the connectivity server 141 via the network 105. For example, the communication unit 102 receives a request for network data from the control unit 103 and delivers the request to the connectivity server 141. In another example, the communication unit 102 receives network data from the connectivity server 141 and delivers the network data to the control unit 103.

The control unit 103 is any processor-based computing device. For example, the control unit 103 is an electronic control unit ("ECU") implemented in a vehicle. In one embodiment, the control unit 103 is implemented using a single integrated circuit such as a system-on-chip (SOC). In one embodiment, the control unit 103 generates vehicle data based at least in part on the input from a user 125. For example, when a user 125 who is a driver inputs a destination, the control unit 103 detects a current location of the vehicle and calculates an expected driving route to the destination. The control unit 103 then generates vehicle data describing the current location, the destination and the expected driving route. The control unit 103 stores the vehicle data in the storage device 104. In another embodiment, the control unit 103 generates vehicle data based at least in part on one or more images from the camera 124 and one or more sensor signals from the sensor 122. For example, the control unit 103 receives sensor signals describing vehicle velocities periodically at a certain time interval. The control unit 103 processes the sensor signals and generates vehicle data indicating an average vehicle velocity.

The control unit 103 comprises, among other things, a processor 112, a network management module 114, a navigation module 116 and a buffering module 118. In another embodiment, the control unit 103 includes other components conventional to a control unit such as a memory (not pictured) and an I/O interface (not pictured).

The processor 112 comprises an arithmetic logic unit, a microprocessor, a general purpose controller or some other processor array to perform computations, retrieve data stored on the storage device 104, etc. The processor 112 processes data signals and may comprise various computing architectures including a complex instruction set computer (CISC) architecture, a reduced instruction set computer (RISC) architecture, or an architecture implementing a combination of instruction sets. Although only a single processor 112 is shown in FIG. 1, multiple processors 112 may be included. The processing capability of the processor 112 may be limited to supporting the display of signals and the capture and transmission of signals. The processing capability of the processor 112 might be enough to perform more complex tasks, including various types of feature extraction and sampling. It will be obvious to one skilled in the art that other processors, operating systems, sensors, displays and physical configurations are possible.

The network management module 114 is code and routines for managing network connectivity for the vehicle. For example, the network management module 114 requests network data from the connectivity server 141 based at least in part on vehicle data. The network management module 114 receives network data and determines the best network connectivity for the vehicle based at least in part on the network data. In one embodiment, the network management module 114 caches the network data and stores the network data in the storage device 104. In another embodiment, the network management module 114 sends the determination of the best network connectivity to the navigation module 116 to navigate the vehicle based on the best network connectivity. The network management module 114 will be described in further detail below with reference to FIG. 2.

The navigation module 116 is code and routines for calculating the best driving route for the vehicle. For example, the navigation module 116 receives the determination of the best network connectivity from the network management module 114. Based on the determination of the best network connectivity, the navigation module 116 calculates the best driving route towards the destination of the vehicle. For example, the best driving route has the best network connectivity.

In one embodiment, the navigation module 116 detects a network interruption and then retrieves network data from the storage device 104. The navigation module 116 determines one or more network coverage areas using the network data and notifies a user 125 of the one or more network coverage areas. The navigation module 116 also calculates one or more driving routes that have the best network coverage based on the network data. After a user 125 such as a driver chooses one of the driving routes, the navigation module 116 navigates the vehicle to the destination based on the driving route. In another embodiment, the navigation module 116 notifies a user 125 of the nearest network coverage area when detecting a network interruption beforehand or afterward. The navigation module 116 navigates the vehicle to the nearest network coverage area based on the agreement of the user 125.

The buffering module 118 is code and routines for buffering or pre-fetching content data in case of a network interruption. In one embodiment, the buffering module 118 retrieves network data from the storage device 104 and determines whether there is a network interruption beforehand based at least in part on the network data. The buffering module 118 buffers content data if determining that there is a network interruption beforehand. In another embodiment, the buffering module 118 also predicts a starting time and a length of an interruption time period for the network interruption based at least in part on the network data. The buffering module 118 then buffers content data for the interruption time period.

For example, the buffering module 118 predicts a network interruption based on the coverage information for areas along the driving route. The buffering module 118 determines a location and a length of a portion on the driving route without network coverage based on the coverage information. The buffering module 118 then calculates a starting time and a length of the interruption time period based on the location and the length of the portion without network coverage and the average vehicle velocity. The buffering module 118 then buffers content data (such as media data) for the predicted network interruption. For example, while a passenger 125 is watching a video in the vehicle, the buffering module 118 predicts a network interruption that will start in one minute and will last for three minutes. The buffering module 118 buffers the video content for the expected network interruption. In this way, long media files can be played consistently in the vehicle or can automatically resume later from where they stop playing.

The sensor 122 is any type of conventional sensor configured to collect any type of data. For example, the sensor 122 is one of the following: a light detection and ranging (LIDAR) sensor; an infrared detector; a motion detector; a thermostat; and a sound detector, etc. Persons having ordinary skill in the art will recognize that other types of sensors are possible. In one embodiment, the sensor 122 measures a condition related to the vehicle. The sensor 122 generates a sensor signal describing the condition based on the measurement. For example, the sensor 122 measures a vehicle velocity and generates a sensor signal describing the vehicle velocity. In another embodiment, the sensor 122 measures a condition in an environment that is external to the vehicle and generates a sensor signal describing the measurement. The sensor 122 sends the sensor signal to the control unit 103. In one embodiment, the vehicle system 101 includes a combination of different types of sensors 122.

The camera 124 is depicted in FIG. 1 using a dotted line to indicate that it is an optional element for the vehicle system 101. Accordingly, in one embodiment, the vehicle system 101 does not include the camera 124.

The camera 124 is an optical device for recording images. For example, the camera 124 takes pictures of roads, traffic lights, vehicles, pedestrians crossing the road, etc., external to a vehicle as the vehicle is driven down a road. In one embodiment, the camera 124 is configured to capture a video including successive frames that describe an environment surrounding a road when a driver is driving a vehicle on the road. The camera 124 sends the images to the control unit 103.

The interface 120 is a device configured to handle communications between the user 125 and the control unit 103. For example, the interface 120 includes one or more of an in-vehicle touch screen for receiving inputs from the user 125 and a microphone for capturing voice inputs from the user 125. The interface 120 sends the inputs from the user 125 to the control unit 103. In one embodiment, the interface 120 is configured to transmit an output from the control unit 103 to the user 125. For example, the interface 120 includes a display device for displaying network connectivity information and/or driving route information to the user 125. One having ordinary skill in the art will recognize that the interface 120 may include other types of devices for providing the functionality described herein.

The user 125 is a human user. In one embodiment, the user 125 is a driver driving a vehicle on a road. In another embodiment, the user 125 is a passenger sitting in the vehicle. The user 125 interacts with, or otherwise provides an input to, an interface 120, which sends and receives different types of data to and from the control unit 103. For example, the interface 120 is a touch screen and the user 125 touches a portion of the touch screen with a finger or a stylus to provide an input. In one embodiment, the user 125 inputs destination data to the control unit 103 via the interface 120.

The storage device 104 is a non-transitory memory that stores data. For example, the storage device 104 is a dynamic random access memory (DRAM) device, a static random access memory (SRAM) device, flash memory or some other memory device known in the art. In one embodiment, the storage device 104 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 104 is described below in more detail with reference to FIG. 3.

The unified cloud database 150 is an online database accessible from the network 105. For example, the unified cloud database 150 is a database where data is stored on multiple virtual servers hosted by different companies. In one embodiment, the unified cloud database 150 stores any data for providing the functionality of the system 100. In another embodiment, the unified cloud database 150 stores data received from a plurality of vehicle systems 101 and from the connectivity server 141.

Network Management Module 114

Figure 2:
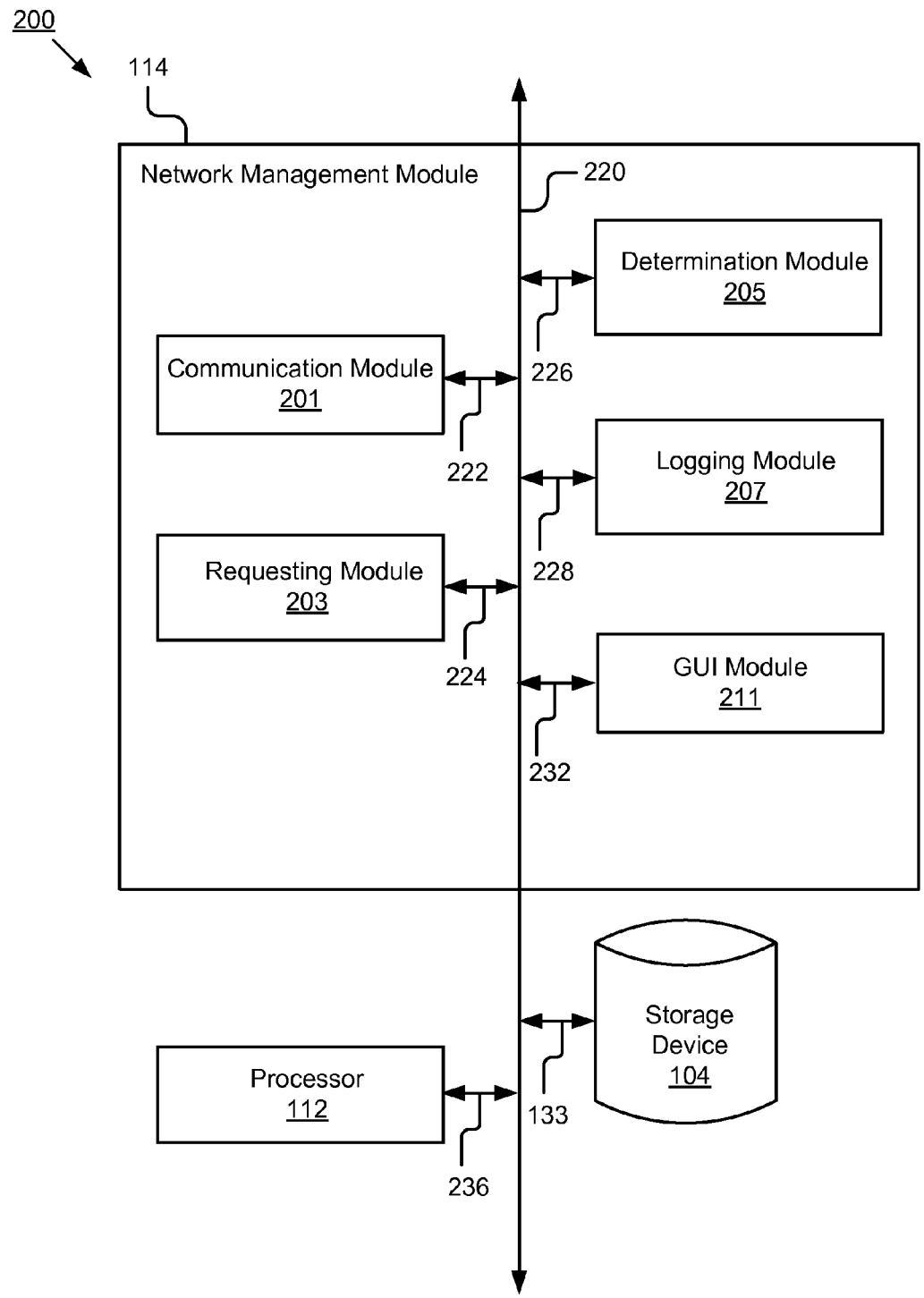
FIG. 2 is a block diagram illustrating a network management module in detail according to one embodiment.

Referring now to FIG. 2, a network management module 114 is shown in more detail. FIG. 2 is a block diagram 200 illustrating a network management module 114 according to one embodiment. The network management module 114 comprises a communication module 201, a requesting module 203, a determination module 205, a logging module 207 and a graphical user interface (GUI) module 211. These components of the network management module 114 are communicatively coupled to a bus 220 for communication with one another.

In the illustrated embodiment, the communication module 201 is communicatively coupled to the bus 220 via signal line 222. The requesting module 203 is communicatively coupled to the bus 220 via signal line 224. The determination module 205 is communicatively coupled to the bus 220 via signal line 226. The logging module 207 is communicatively coupled to the bus 220 via signal line 228. The GUI module 211 is communicatively coupled to the bus 220 via signal line 232. The processor 112 is communicatively coupled to the bus 220 via signal line 236. The storage device 104 is communicatively coupled to the bus 220 via signal line 133.

The communication module 201 is code and routines for handling communication between components of the network management module 114 and other components of the vehicle system 101. For example, the communication module 201 receives a request for network data from the requesting module 203 and sends the request to the connectivity server 141. The communication module 201 receives the network data from the connectivity server 141 and delivers the network data to the determination module 205. In one embodiment, the communication module 201 also caches the network data and stores the network data in the storage device 104. The communication module 201 is communicatively coupled to the bus 220 via signal line 222.

The communication module 201 receives connectivity data logs from the logging module 207. In one embodiment, the communication module 201 sends the connectivity data logs to the connectivity server 141 for analysis and storage. In another embodiment, the communication module 201 stores the connectivity data log in the storage device 104 as log data.

In one embodiment, the communication module 201 receives graphical data from the GUI module 211. The communication module 201 sends the graphical data to the interface 120 for displaying information to a user 125. For example, the graphical data is used to generate a user interface for displaying network connectivity information (e.g., a recommended network carrier, a recommended wireless technology such as WiFi) to the user 125.

In one embodiment, the communication module 201 also handles the communications between other sub-modules 203, 205, 207 and 211 in the network management module 114. For example, the communication module 201 communicates with the determination module 205 and the logging module 207 to pass an output of the determination module 205 (such as a determination of the best network connectivity) to the logging module 207. However, this description may occasionally omit mention of the communication module 201 for purposes of clarity and convenience. For example, for purposes of clarity and convenience, the above scenario may be described as the determination module 205 passing an output (such as a determination of the best network connectivity) to the logging module 207.

The requesting module 203 is code and routines for requesting network data. For example, after the user 125 inputs a new destination or the navigation module 116 estimates a new destination for the vehicle, the vehicle data is updated and the requesting module 203 retrieves the updated vehicle data from the storage device 104. The updated vehicle data describes the new destination, a current vehicle location and an expected driving route to the new destination. The requesting module 203 generates a request for network data based at least in part on the updated vehicle data. The requesting module 203 is communicatively coupled to the bus 220 via signal line 224.

In one embodiment, the requesting module 203 retrieves vehicle data from the storage device 104 and requests network data based at least in part on the vehicle data periodically at a certain time interval. For example, the requesting module 203 requests network data from the connectivity server 141 based on vehicle data in a predetermined time interval such as 30 minutes, an hour, five hours, etc. In another embodiment, once destination data and/or driving route data is updated, the requesting module 203 retrieves updated vehicle data from the storage device 104 and requests network data based at least in part on the updated vehicle data.

The requesting module 203 generates a request for network data based at least in part on the vehicle data. For example, the requesting module 203 generates a request including the vehicle data describing the destination, the current location and the expected driving route to the destination. In this way, the connectivity server 141 can provide the requested network data based at least in part on the vehicle data. For example, based at least in part on the expected driving route, the connectivity server 141 provides network data describing the network coverage information for the areas along the expected driving route.

The determination module 205 is code and routines for determining one or more best networks for the vehicle. For example, the determination module 205 determines one or more best networks for the vehicle based at least in part on the network data received from the connectivity server 141. The determination module 205 transmits a determination of the one or more best networks to the logging module 207. The determination module 205 is communicatively coupled to the bus 220 via signal line 226.

The determination module 205 receives network data from the connectivity server 141 via the communication module 201. The network data includes coverage data, accounting data, congestion data and connectivity rule and policy data. The determination module 205 caches the network data and stores it in the storage device 104. In one embodiment, the determination module 205 determines one or more available networks based at least in part on the coverage data. For example, the determination module 205 parses the network data for coverage information for a current location and/or areas along the expected driving route to determine one or more available networks.

In one embodiment, the determination module 205 generates a rank of the one or more available networks based at least in part on accounting data, congestion data and data volume agreements with carriers. For example, the determination module 205 ranks a less crowded network higher than a more crowded network and ranks a network with more data usable for the vehicle higher than a network with less data usable for the vehicle. The determination module 205 also balances data usage amount or traffic amount across carriers based on the data volume agreements with carriers. For example, if a certain number of vehicles have connected to a network provided by one carrier for a certain period of time, other carriers rank higher than this carrier.

In one embodiment, the determination module 205 adjusts the rank of the available networks based on what an application on the vehicle requires for the network connectivity. For example, if the user 125 (e.g., a driver or a passenger) listens to music or watches a video on the internet which requires high bandwidth, the determination module 205 ranks a network providing greater bandwidth higher. In another example, if the vehicle requires a transmission of diagnostic data to the connectivity server 141, the determination module 205 ranks a more reliable network technology (e.g., a 3G or GSM network technology) higher.

In one embodiment, the determination module 205 determines one or more best networks among the one or more available networks based on the rank and priorities included in connectivity rule and policy data. For example, the determination module 205 parses network data for connectivity rule and policy data. The connectivity rule and policy data includes priorities of carriers, general priorities of wireless network technologies and priorities of wireless network technologies for different data types. For example, generally Verizon has a higher priority than AT&T; generally 3G has a higher priority than WiFi, WiFi has a higher priority than LTE and LTE has a higher priority than WiMAX; however, for movie data, WiFi has the highest priority and for safety data 3G has the higher priority. The determination module 205 uses the rank and the priorities to determine the best network (e.g., the best carrier and/or the best wireless network technology).

The logging module 207 is code and routines for logging connectivity data. For example, the logging module 207 receives a determination from the determination module 205 including one or more best networks. In one embodiment, once the vehicle connects to one of the best networks, the logging module 207 logs connectivity data and stores the connectivity data log in the storage device 104. The connectivity data describes one or more of an amount of data usage, a date of the data usage, a time of the data usage and a carrier providing the data usage. The logging module 207 is communicatively coupled to the bus 220 via signal line 228.

In one embodiment, the logging module 207 sends the connectivity data log to the connectivity server 141 for analysis periodically at a certain time interval. For example, the logging module 207 sends the connectivity data log to the connectivity server 141 at a predetermined time interval such as 1 hour, 10 hours, 24 hours, etc. In another embodiment, the logging module 207 sends the connectivity data log to the connectivity server 141 for analysis when the connectivity data log is updated. For example, when the vehicle is connected to a new network, the logging module 207 updates the connectivity data log based on data describing the carrier and/or wireless technology of the new network, the date and time of the connection and the data usage since the connection.

The GUI module 211 is code and routines for providing graphical data for a user 125. The GUI module 211 is communicatively coupled to the bus 220 via signal line 232. In one embodiment, the GUI module 211 generates graphical data for depicting a user interface to notify a user 125 of one or more best available networks. For example, the GUI module 211 receives information describing one or more carriers and/or wireless technologies of the best available networks. The GUI module 211 generates graphical data to depict a user interface for displaying the information for the best available networks to a user 125. The GUI module 211 sends the generated graphical data to the interface 120, causing the interface 120 to present the user interface to the user 125 so that the user 125 can choose a network from the best available networks via the user interface.

Storage Device 104

Figure 3:
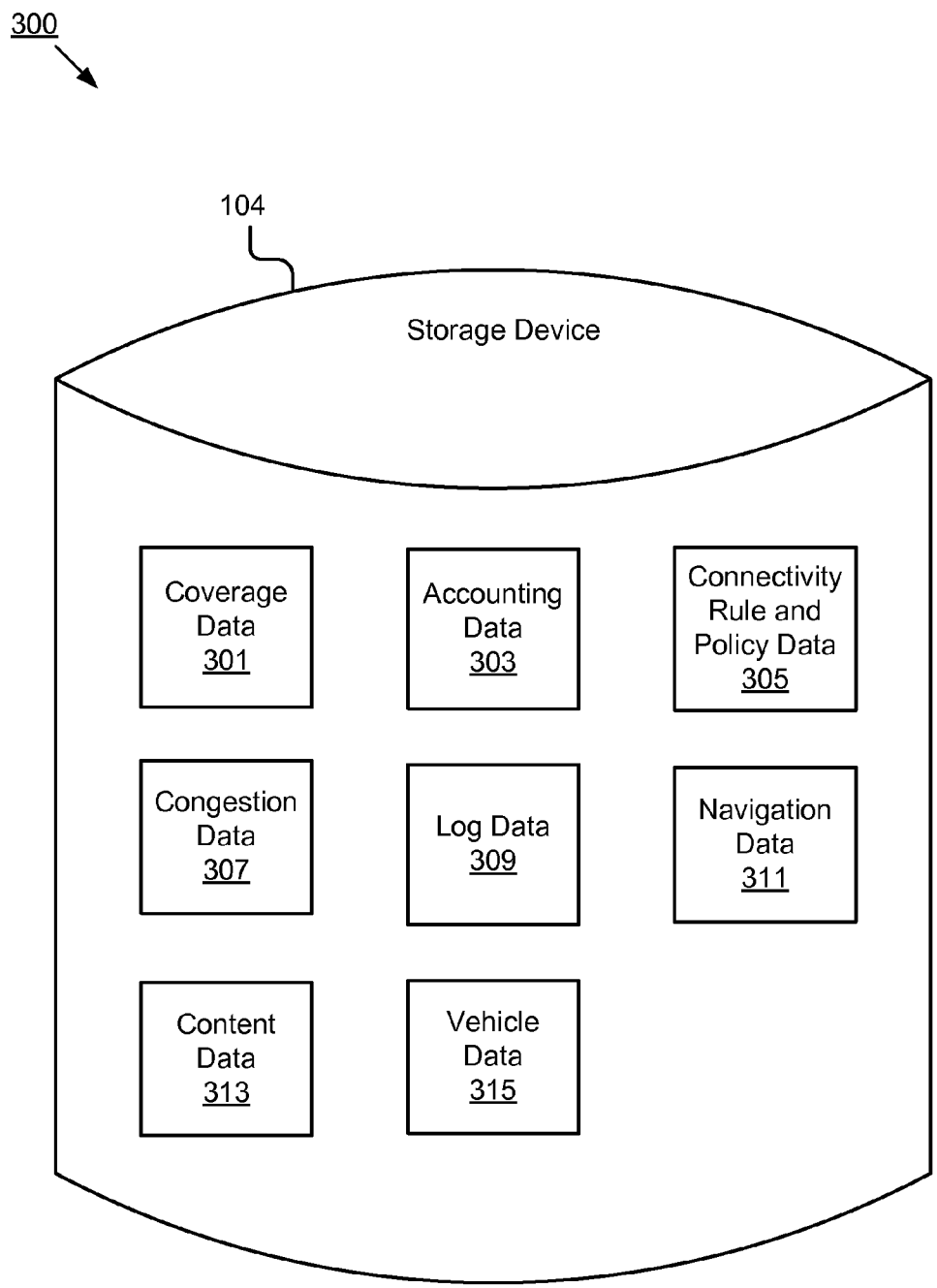
FIG. 3 is a block diagram illustrating a storage device according to one embodiment.

FIG. 3 is a block diagram 300 illustrating a storage device 104 according to one embodiment. The storage device 104 includes coverage data 301, accounting data 303, connectivity rule and policy data 305, congestion data 307, log data 309, navigation data 311, content data 313 and vehicle data 315. One skilled in the art will recognize that the storage device 104 may include other data for providing the functionality described herein.

The coverage data 301 is data describing network coverage information. For example, the coverage data 301 includes a 3G/LTE/4G coverage map, WiFi/WiMAX hotspot information and a satellite map for each prospective carrier. In one embodiment, the connectivity server 141 receives coverage data 301 from different carriers and stored the coverage data 301 in the connectivity database 144. When the vehicle system 101 requests coverage data 301 based on a new destination and/or a new driving route, the connectivity server 141 provides the coverage data 301 regarding the new destination and/or the new driving route to the vehicle system 101. The vehicle system 101 stores the coverage data 301 in the storage device 104.

The accounting data 303 includes the connectivity data log. For example, each entry of the log records data usage information of the vehicle, e.g., an amount of data usage, a date of data usage, a time of data usage and a carrier providing data usage. In one embodiment, the accounting data 303 indicates how much data the vehicle is allowed to use over a certain period of time. In one embodiment, the connectivity server 141 receives connectivity data logs from different vehicle systems 101 and stores the connectivity data logs in the account log database 175. The connectivity server 141 validates and analyzes each carrier's activity based on the connectivity data logs. When one vehicle system 101 requests its connectivity data log, the connectivity server 141 retrieves the connectivity data log from the account log database 175 and sends the connectivity data log to the vehicle system 101. The vehicle system 101 receives the connectivity data log and stores it in the storage device 104 as accounting data 303.

The connectivity rule and policy data 305 is data describing rules and policies for selecting a best network for a vehicle. For example, the connectivity rule and policy data 305 indicates priorities of carriers, general priorities of wireless network technologies and priorities of wireless network technologies for different data types. In one embodiment, the connectivity server 141 retrieves the connectivity rule and policy data 305 from the connectivity database 144 based on a request from the vehicle system 101 and sends the connectivity rule and policy data 305 to the vehicle system 101. The vehicle system 101 stores the connectivity rule and policy data 305 in the storage device 104.

The congestion data 307 is data describing how crowded a network is. For example, the congestion data 307 indicates if there is congestion in each prospective network. In one embodiment, when a vehicle system 101 requests congestion data 307, the connectivity server 141 retrieves congestion data 307 from the connectivity database 144 and sends the congestion data 307 to the vehicle system 101. The vehicle system 101 stores the congestion data 307 in the storage device 104.

The log data 309 includes the connectivity data log maintained in the vehicle. For example, the logging module 207 generates and updates the connectivity data log periodically at a certain time interval such as one hour, five hours, 12 hours, 24 hours, etc. The connectivity data log records data usage information of the vehicle, e.g., amounts of data usages, dates and times of data usages and carriers providing data usages. In one embodiment, the logging module 207 sends the updated connectivity data log to the connectivity server 141 for validating and analyzing each carrier's activity.

The navigation data 311 is generated by the navigation module 116. For example, the navigation data 311 includes data describing one or more driving routes that have the best network coverage. In one embodiment, the navigation module 116 determines one or more network coverage areas based at least in part on network data and calculates one or more driving routes that have the best network coverage. The navigation module 116 stores data describing the one or more driving routes that have the best network coverage in the storage device 104 as navigation data 311.

The content data 313 is data buffered by the buffering module 118. For example, the content data 313 includes media data from the internet such as video content data, audio content data, etc. In one embodiment, the buffering module 118 predicts a network interruption and calculates an interruption time period based at least in part on network data. The buffering module 118 buffers content data 313 from the internet for the network interruption.

The vehicle data 315 includes data associated with the vehicle. For example, the vehicle data 315 includes location data, destination data and driving route data. In another example, the vehicle data 315 also includes vehicle velocity data. The location data describes a current location of the vehicle. The destination data indicates a destination for the vehicle. The driving route data describes an expected driving route to the destination. In one embodiment, control unit 103 generates vehicle data 315 and stores the vehicle data 315 in the storage device 104. The requesting module 203 generates a request for network data based at least in part on the vehicle data 315.

Methods

Referring now to FIGS. 4-6B, various embodiments of the methods of the specification will be described.

Figure 4:
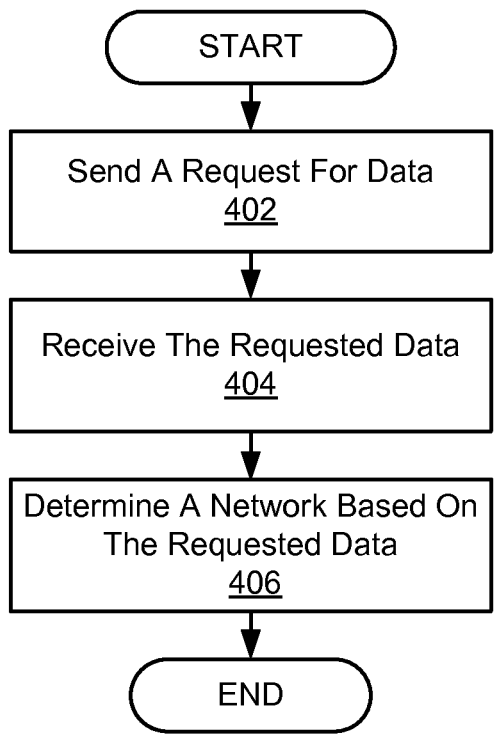
FIG. 4 is a flow diagram illustrating a method for determining a network according to one embodiment.

FIG. 4 is a flow diagram illustrating a method 400 for determining a network according to one embodiment. The requesting module 203 sends 402 a request for network data to the connectivity server 141. In one embodiment, the request includes vehicle data that describes a current location of the vehicle, a destination of the vehicle and a driving route to the destination. The connectivity server 141 provides network data based at least in part on the vehicle data.

At step 404, the determination module 205 receives the requested network data from the connectivity server 141 via the communication module 201. For example, the requested network data includes coverage data, accounting data, congestion data and connectivity rule and policy data.

At step 406, the determination module 205 determines the best network for the vehicle based at least in part on the requested network data including coverage data, accounting data, congestion data and connectivity rule and policy data. The best network is determined using the network data as factors. Furthermore, the best network can be varied based on the vehicle data (e.g., the destination, the driving route), date, time, etc.

Figure 5A:
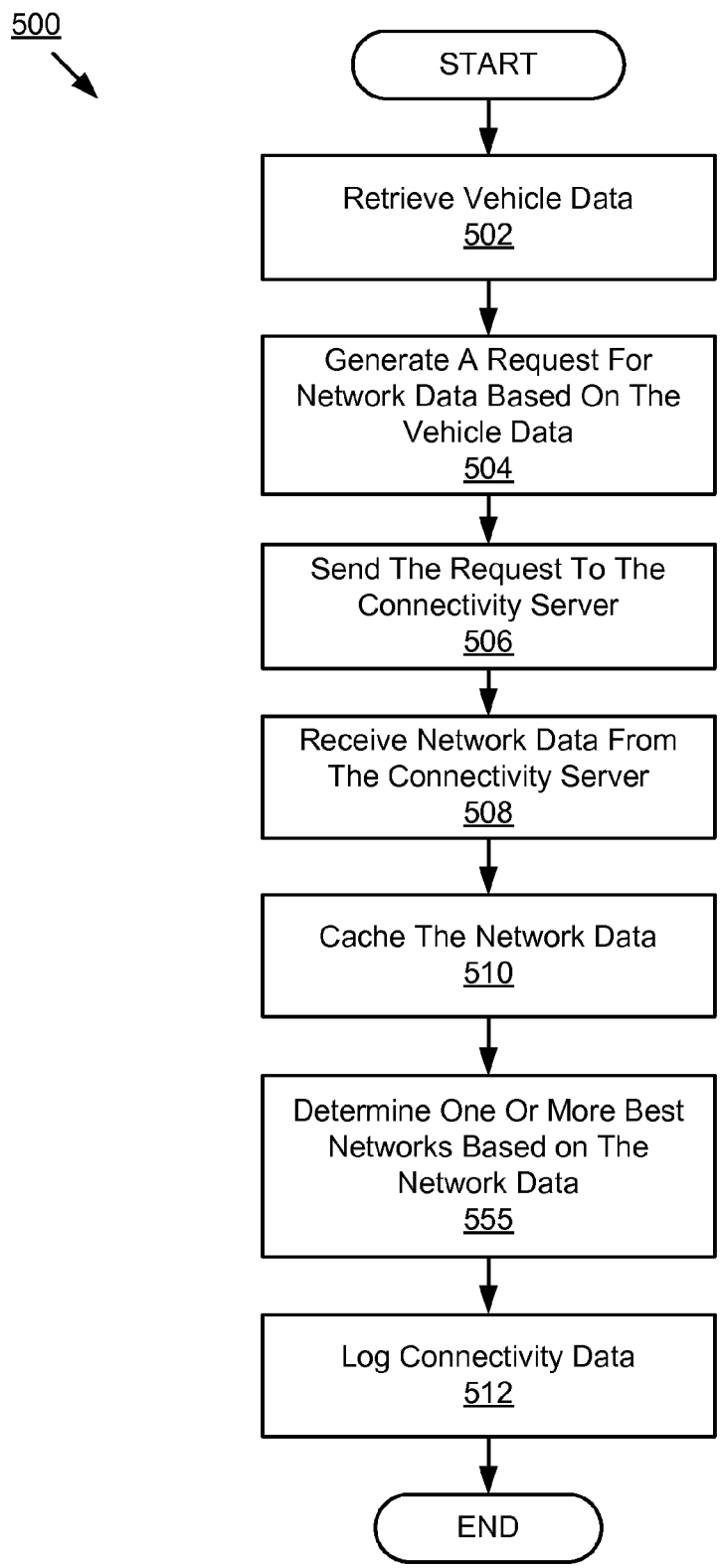
FIGS. 5A-5B are flow diagrams illustrating a method for determining a network according to another embodiment.
Figure 5B:
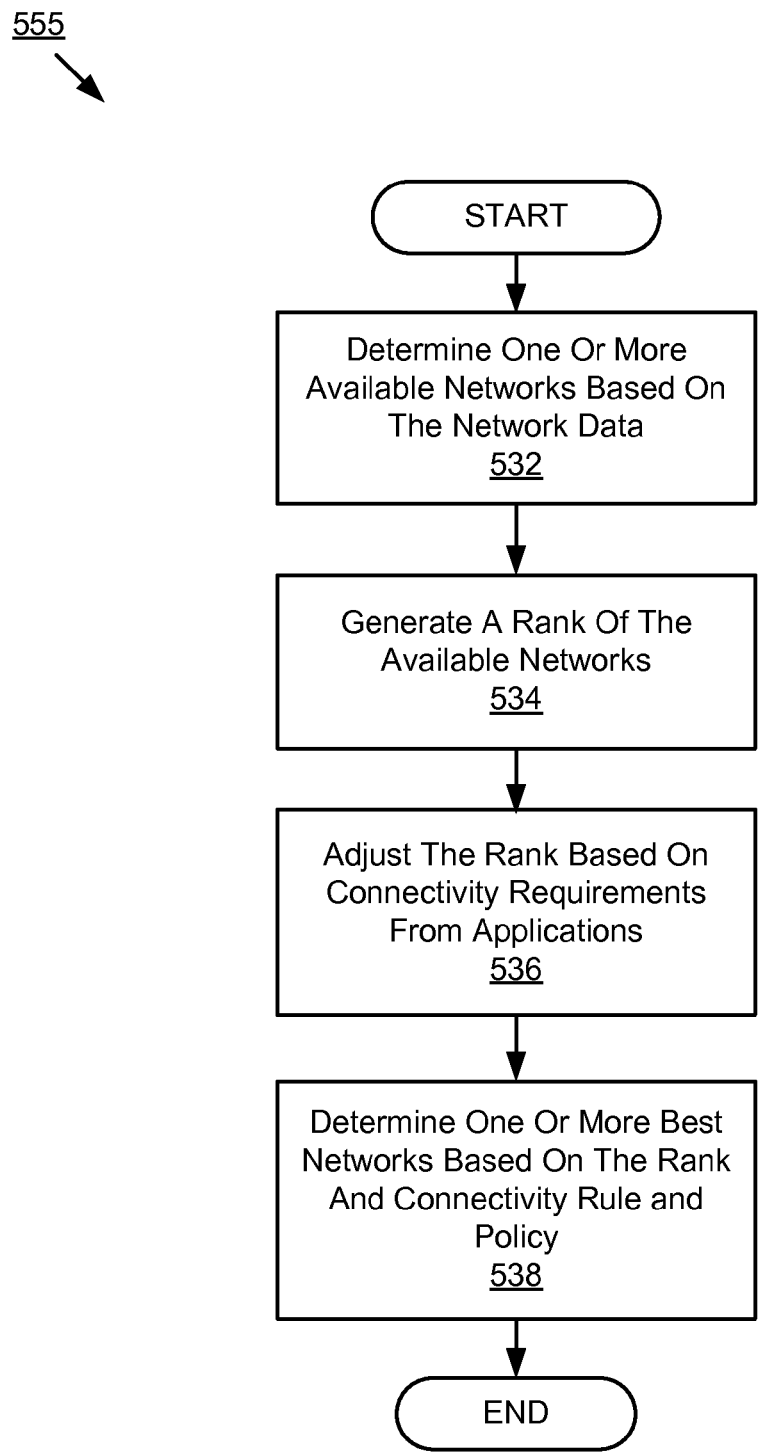

FIGS. 5A-5B are flow diagrams illustrating a method 500 for determining one or more best networks. The requesting module 203 retrieves 502 vehicle data. For example, after the user 125 inputs a new destination or the navigation module 116 estimates a new destination, the requesting module 203 retrieves updated vehicle data from the storage device 104. The updated vehicle data describes the new destination, a current vehicle location and an expected driving route to the new destination.

At step 504, the requesting module 203 generates a request for network data based on the vehicle data. For example, the request includes the updated vehicle data describing the new destination, the current vehicle location and the expected driving route to the new destination. At step 506, the requesting module 203 sends the request to the connectivity server 141. In this way, the connectivity server 141 can provides network data to the determination module 205 based at least in part on the vehicle data.

At step 508, the determination module 205 receives the network data from the connectivity server 141. For example, the network data includes coverage data, accounting data, congestion data and connectivity rule and policy data. At step 510, the determination module 205 caches the network data. For example, the determination module 205 stores the network data in the storage device 104.

Referring now to FIG. 5B, the sub-routine 555 for determining one or more best networks based on the network data is illustrated according to one embodiment. The determination module 205 determines 532 one or more available networks based on the network data. For example, the determination module 205 parses the network data for coverage information for the current vehicle location and/or areas along the expected driving route to the destination to determine one or more available networks.

At step 534, the determination module 205 generates a rank of the available networks. For example, the determination module 205 ranks the available networks based at least in part on the accounting data, the congestion data and data volume agreements with carriers.

At step 536, the determination module 205 adjusts the rank based at least in part on connectivity requirements from applications in the vehicle. For example, if an application in the vehicle requires high bandwidth, e.g., the application needs to play video, the determination module 205 adjusts the rank of a network providing higher bandwidth to rank it higher.

At step 538, the determination module 205 determines one or more best networks based at least in part on the rank and connectivity rule and policy data. For example, the connectivity rule and policy data includes priorities of carriers, general priorities of wireless network technologies and priorities of wireless network technologies for different data types. The determination module 205 uses the rank and the priorities to determine one or more best networks such as one or more best carrier and/or one or more best wireless network technologies.

After step 538, the sub-routine 555 ends and the method 500 reverts to step 512. Referring back to FIG. 5A, at step 512 the logging module 207 logs connectivity data. For example, once the vehicle connects to one of the best networks, the logging module 207 logs connectivity data and stores the connectivity data log in the storage device 104.

Figure 6:
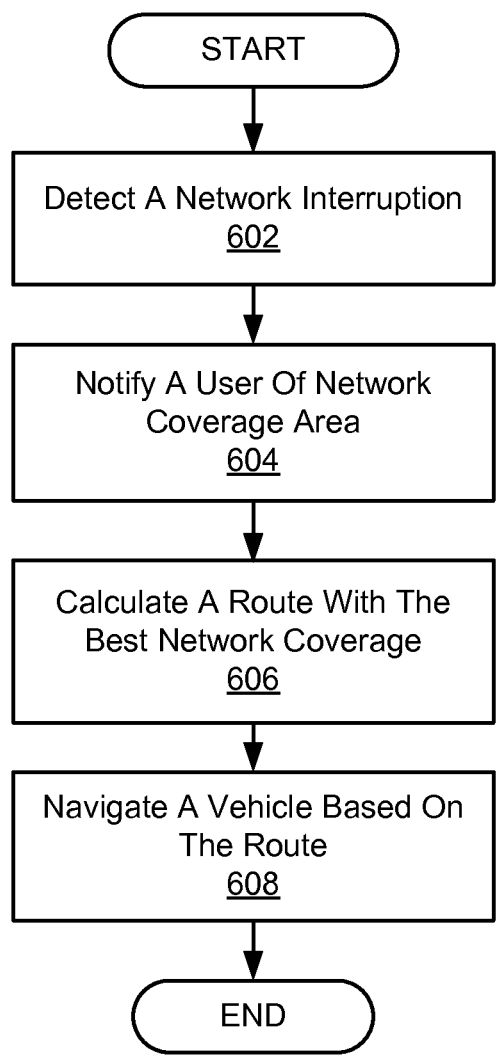
FIG. 6 is a flow diagram illustrating a method for navigating a vehicle based on network coverage information according to one embodiment.

FIG. 6 is a flow diagram illustrating a method 600 for navigating a vehicle based on network coverage information according to one embodiment. The navigation module 116 detects 602 a network interruption and retrieves network data from the storage device 104 responsive to the detection of the network interruption. For example, the retrieved network data includes coverage data describing network coverage information. The navigation module 116 determines one or more network coverage areas around the current vehicle location based at least in part on the network coverage information. At step 604, the navigation module 116 notifies a user 125 of the one or more network coverage areas.

At step 606, the navigation module 116 calculates a driving route that has the best network coverage based at least in part on the network coverage information. At step 608, the navigation module 116 navigates a vehicle based on the driving route. For example, the navigation module 116 sends data describing the driving route to the interface 120 to display it to a user 125 such as a driver. If the user 125 agrees with the driving route, the navigation module 116 navigates the vehicle to the destination based on the driving route.

Figure 7:
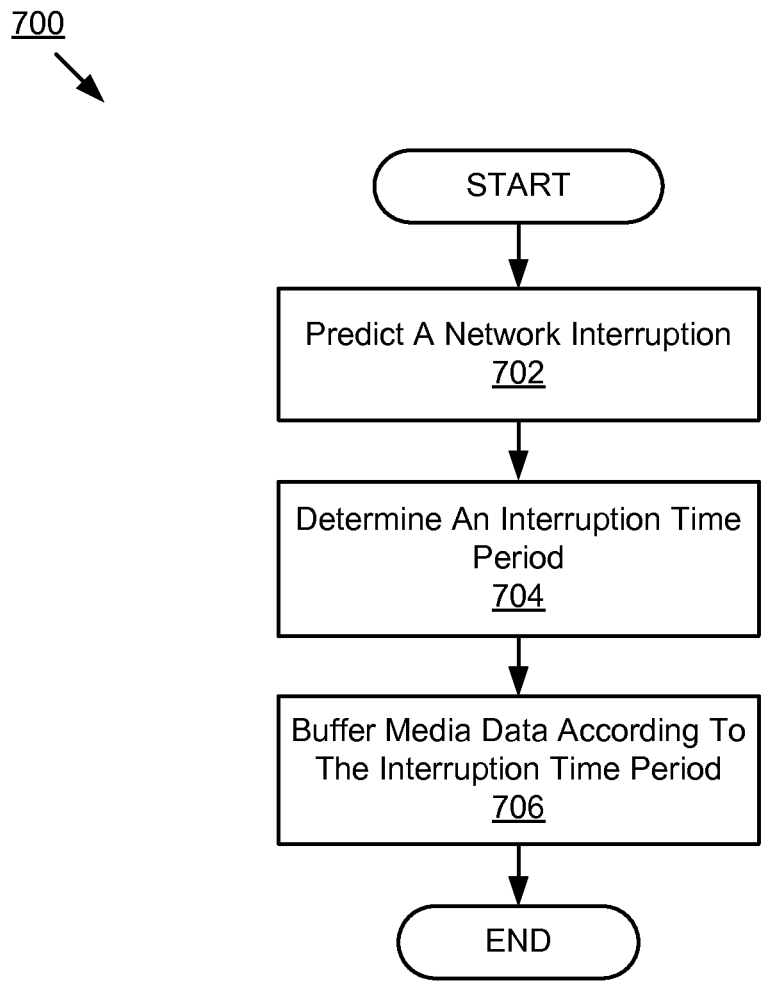
FIG. 7 is a flow diagram illustrating a method for buffering media data responsive to a network interruption according to one embodiment.

FIG. 7 is a flow diagram illustrating a method 700 for buffering media data responsive to a network interruption according to one embodiment. The buffering module 118 predicts 702 a network interruption. For example, the buffering module 118 retrieves network data from the storage device 104 and determines whether there is a network interruption beforehand based at least in part on the network data. In one embodiment, the buffering module 118 determines that there is a network interruption beforehand.

At step 704, the buffering module 118 determines an interruption time period based on the network data. For example, the buffering module 118 calculates a starting time and a length of the interruption time period according to a location and a length of the portion on the driving route without network coverage and the average vehicle velocity.

At step 706, the buffering module 118 buffers media data according to the interruption time period. For example, the buffering module 118 buffers video content that a user 125 (e.g., a passenger) is watching in the vehicle for the expected interruption time period.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   sending a request from a vehicle for network data to a connectivity server, the request including vehicle data that describes a current location of the vehicle and a destination for the vehicle, the requested network data associated with the vehicle data;
   receiving the network data from the connectivity server, the network data relating to one or more networks;
   determining a network for the vehicle to connect to from the one or more networks based at least in part on the network data by at least
      determining one or more available networks based at least in part on the network data,
      generating a rank of the one or more available networks based at least in part on the network data and one or more data volume agreements with one or more carriers,
      adjusting the rank of the one or more available networks based at least in part on a requirement of an application, and
      determining the network to connect to from the one or more available networks based at least in part on the adjusted rank and the network data including a rule describing how the vehicle will determine a network to connect to, the network interconnecting a plurality of computing devices; and
   calculating a driving route for the vehicle toward the destination based on the network.

2. The method of claim 1, the network data describes one or more of coverage area for one or more networks, a network connection history for the vehicle, present congestion of one or more networks and a rule describing how the vehicle will determine a network to connect to.

3. The method of claim 1, wherein the network data comprises a connectivity data log describing an amount of data usage, date of the data usage, a time of the data usage and a carrier providing the data usage.

4. The method of claim 1 further comprising:
   logging connectivity data associated with a connection to the network by the vehicle; and
   transferring a connectivity data log to the connectivity server.

5. A system comprising:
   one or more processors;
   a requesting module executable by the one or more processor to send a request from a vehicle for network data to a connectivity server, the request including vehicle data that describes a current location of the vehicle and a destination for the vehicle, the requested network data associated with the vehicle data;
   a determination module executable by the one or more processors and communicatively coupled to the requesting module, the determination module further executable to receive the network data from the connectivity server, the network data relating to one or more networks, the determination module further executable to determine a network for the vehicle to connect to from the one or more networks based at least in part on the network data by at least
   determining one or more available networks based at least in part on the network data,
   generating a rank of the one or more available networks based at least in part on the network data and one or more data volume agreements with one or more carriers,
   adjusting the rank of the one or more available networks based at least in part on a requirement of an application, and
   determining the network to connect to from the one or more available networks based at least in part on the adjusted rank and the network data including a rule describing how the vehicle will determine a network to connect to, the network interconnecting a plurality of computing devices; and
   a navigation module executable by the one or more processors to calculate a driving route for the vehicle toward the destination based on data describing the network, the navigation module further executable and communicatively coupled to receive the data describing the network.

6. The system of claim 5, the network data describes one or more of coverage area for one or more networks, a network connection history for the vehicle, present congestion of one or more networks and a rule describing how the vehicle will determine a network to connect to.

7. The system of claim 5, wherein network data comprises a connectivity data log describing an amount of data usage, date of the data usage, a time of the data usage and a carrier providing the data usage.

8. The system of claim 5 further comprising a logging module communicatively coupled to the determination module, the logging module configured to log connectivity data associated with a connection to the network by the vehicle and to transfer a connectivity data log to the connectivity server.

9. A computer program product comprising a non-transitory computer readable medium encoding instructions that, in response to execution by a computing device, cause the computing device to perform operations comprising:
 sending a request from a vehicle for network data to a connectivity server, the request including vehicle data that describes a current location of the vehicle and a destination for the vehicle, the requested network data associated with the vehicle data;
 receiving the network data from the connectivity server, the network data relating to one or more networks;
 determining a network for the vehicle to connect to from the one or more networks based at least in part on the network data by at least
  determining one or more available networks based at least in part on the network data,
  generating a rank of the one or more available networks based at least in part on the network data and one or more data volume agreements with one or more carriers,
  adjusting the rank of the one or more available networks based at least in part on a requirement of an application, and
  determining the network to connect to from the one or more available networks based at least in part on the adjusted rank and the network data including a rule describing how the vehicle will determine a network to connect to, the network interconnecting a plurality of computing devices; and
 calculating a driving route for the vehicle toward the destination based on the network.

10. The method of claim 9, the network data describes one or more of coverage area for one or more networks, a network connection history for the vehicle, present congestion of one or more networks and a rule describing how the vehicle will determine a network to connect to.

11. The computer program product of claim 9, wherein the network data comprises a connectivity data log describing an amount of data usage, date of the data usage, a time of the data usage and a carrier providing the data usage.

12. The computer program product of claim 9, wherein instructions encoded in the computer readable medium when executed cause the computing device to perform operations further comprising:
 logging connectivity data associated with a connection to the network by the vehicle; and
 transferring a connectivity data log to the connectivity server.

13. A computer-implemented method for navigating a vehicle, the method comprising:
 retrieving network data, the network data relating to one or more networks;
 detecting a network interruption;
 determining coverage area for the one or more networks based at least in part on the network data, each of the one or more networks interconnecting a plurality of computing devices;
 calculating a driving route based at least in part on the coverage area for the one or more networks;
 determining one or more available networks for the vehicle to connect to from among the one or more networks based at least in part on the network data by at least
  generating a rank of the one or more available networks based at least in part on the network data and one or more data volume agreements with one or more carriers,
  adjusting the rank of the one or more available networks based at least in part on a requirement of an application, and
  determining a network to connect to from the one or more available networks based at least in part on the adjusted rank and the network data including a rule describing how the vehicle will determine a network to connect to; and
 navigating a vehicle based at least in part on the driving route.

14. The method of claim 13, the network data describes one or more of coverage area for one or more networks, a network connection history for the vehicle, present congestion of one or more networks and a rule describing how the vehicle will determine a network to connect to.

* * * * *